W. E. WYCHE.
Plow.
No. 14,075.
Patented Jan. 8, 1856.
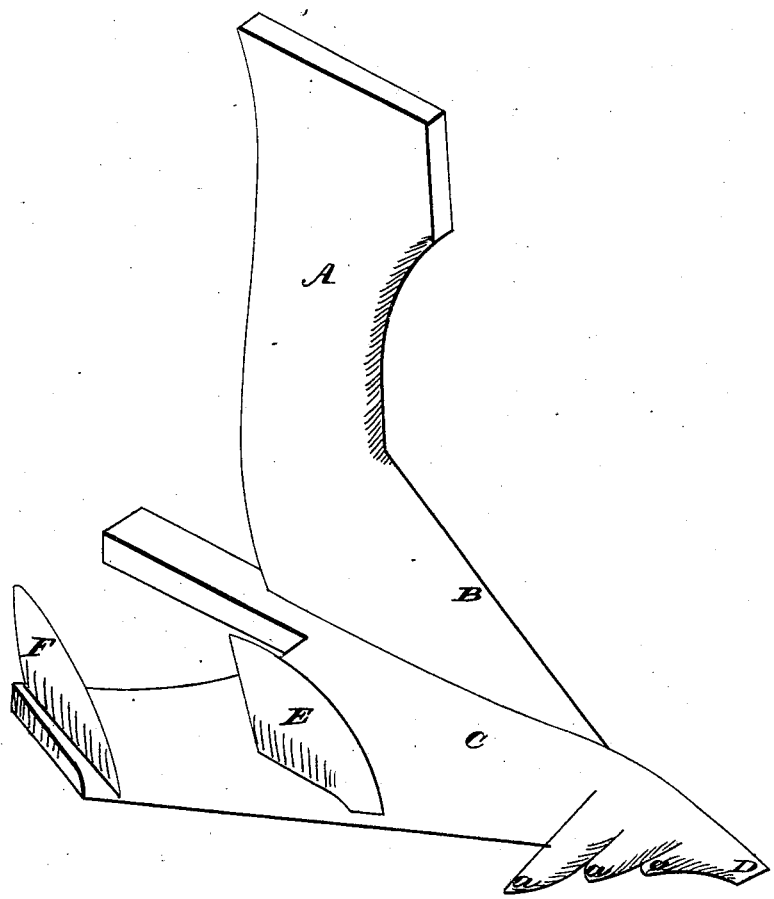

UNITED STATES PATENT OFFICE.

W. E. WYCHE, OF BROOKVILLE, NORTH CAROLINA

IMPROVEMENT IN CULTIVATING-PLOWS.

Specification forming part of Letters Patent No. 14,075, dated January 8, 1856.

*To all whom it may concern:*

Be it known that I, WILLIAM E. WYCHE, of Brookville, in the county of Granville and State of North Carolina, have invented certain new and useful Improvements in Plows; and I do hereby declare the following to be a full, clear, and exact description of the same, reference being had to the accompanying drawing, which represents in perspective so much of the plow as is necessary to exhibit the connection or application of the part deemed new.

The nature of my invention relates to the dividing of the furrow-slice vertically into two or more parts, and turning the outer portion thereof inwards over or against the inner portion, so as to break up the slice and drop it in nearly the same line that it occupied previous to being severed from the land.

To enable others skilled in the art to make and use my invention, I will proceed to describe the same with reference to the drawing.

A represents the standard, B the colter, and C the share, of any ordinary form of plow.

The share in rear of the point D may be provided with a serrated edge, as at *a a a*, for making a draw-cut and more easily severing the furrow-slice from the land.

Upon the share C, at such suitable point or points from the colter as may be desired, is made a vertical cutter, E, which divides the furrow-slice into two parts. The inner half of the divided slice passes directly in rear of its original line before its separation, while the outer half meets the inwardly inclined or curved board F, placed near the rear of the share C, which throws or turns said outer half of the furrow-slice against or over the inner half, and thus mixing or laying one part of the furrow with the other, instead of merely turning it upside down, as heretofore done. By this method of dividing and then uniting the furrow-slice the soil is pulverized, or cultivated so as not to need the after cultivation by a harrow or other pulverizing or cultivating implement.

Having thus fully described the nature of my invention, what I claim therein as new, and desire to secure by Letters Patent, is—

The arranging upon the share of the plow of one or more vertical cutters, with a curved or inclined plate, F, at or near the rear of the outside of the share, for the purpose of dividing the furrow-slice vertically and turning the outer portion in toward the plow, as set forth.

WILL. E. WYCHE.

Witnesses:
JOHN S. HOLLINGSHEAD,
E. COHEN.